Feb. 10, 1925 Re. 15,995

H. STEPHENS

TIE PLATE RAIL ANCHOR

Original Filed March 21, 1923 2 Sheets-Sheet 1

Inventor
Henry Stephens

By Fay Oberlin & Fay
Attorneys

Feb. 10, 1925. Re. 15,995
H. STEPHENS
TIE PLATE RAIL ANCHOR
Original Filed March 21, 1923 2 Sheets-Sheet 2
Fig. 4.
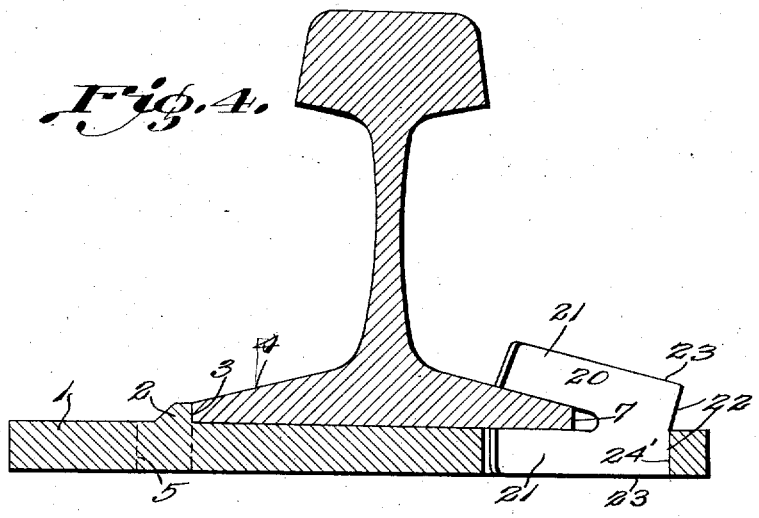
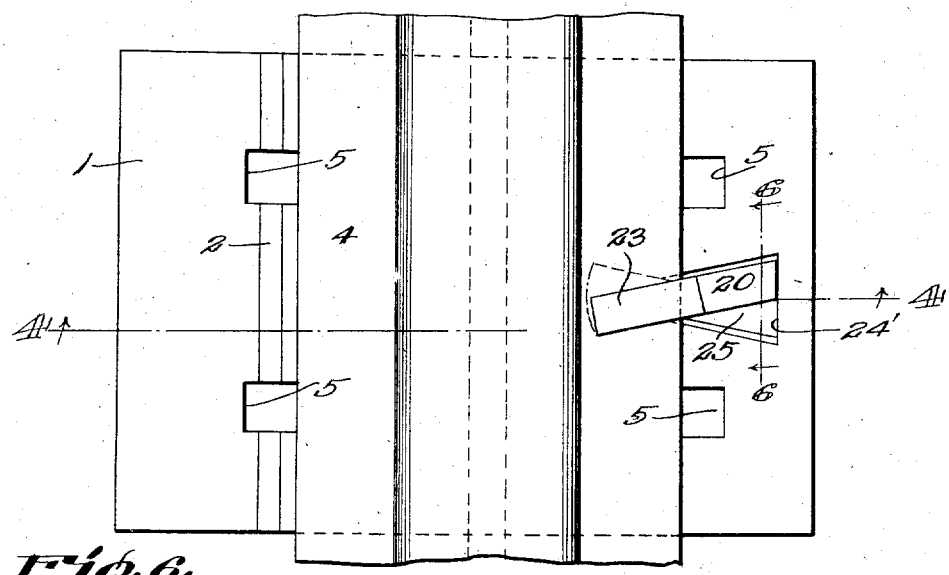
Fig. 6.
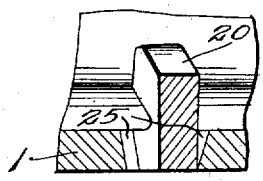
Fig. 5. Inventor
Henry Stephens
By Fay Oberlin & Fay
Attorneys.

Reissued Feb. 10, 1925. Re. 15,995

UNITED STATES PATENT OFFICE.

HENRY STEPHENS, OF CLEVELAND, OHIO.

TIE-PLATE RAIL ANCHOR.

Original No. 1,463,344, dated July 31, 1923, Serial No. 626,527, filed March 21, 1923. Application for reissue filed October 10, 1924. Serial No. 742,915.

*To all whom it may concern:*

Be it known that I, HENRY STEPHENS, a citizen of the United States, and a resident of Cleveland, county of Cuyahoga, and State of Ohio, have invented a new and useful Improvement in Tie-Plate Rail Anchors, of which the following is a specification, the principle of the invention being herein explained and the best mode in which I have contemplated applying that principle, so as to distinguish it from other inventions.

The subject of the present invention is a combined tie plate and rail anchor for railroad rails, and more particularly the invention relates to the particular form of the anchor member and the method of mounting the same on the tie plate so as to serve as an anchor in both directions. Provision is also made to overcome the normal wear between rail and tie plate so as to prevent the anchor from coming loose. To the accomplishment of the foregoing and related ends, said invention, then, consists of the means hereinafter fully described and particularly pointed out in the claims.

The accompanying drawing and the following description set forth in detail certain mechanism embodying the invention, such disclosed means constituting, however, but one of various mechanical forms in which the principle of the invention may be used.

In said accompanying drawing:—

Figure 7:
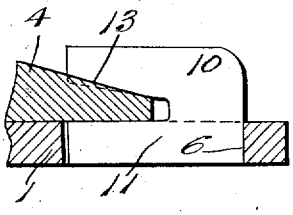
Figure 1:
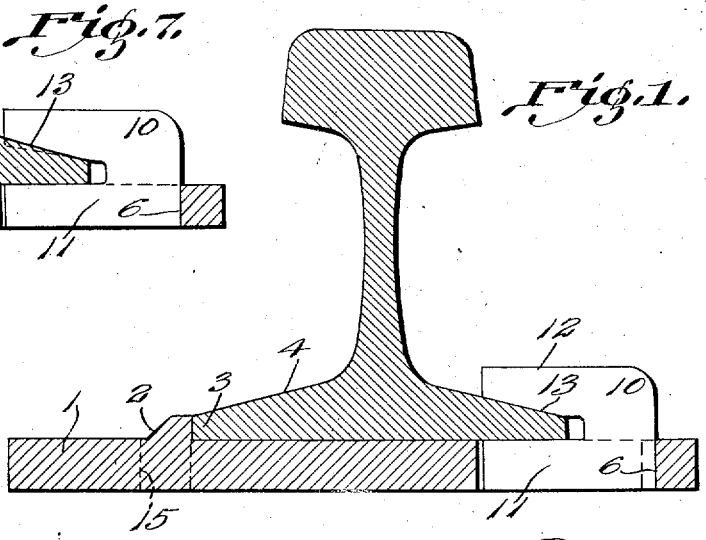
Figure 3:
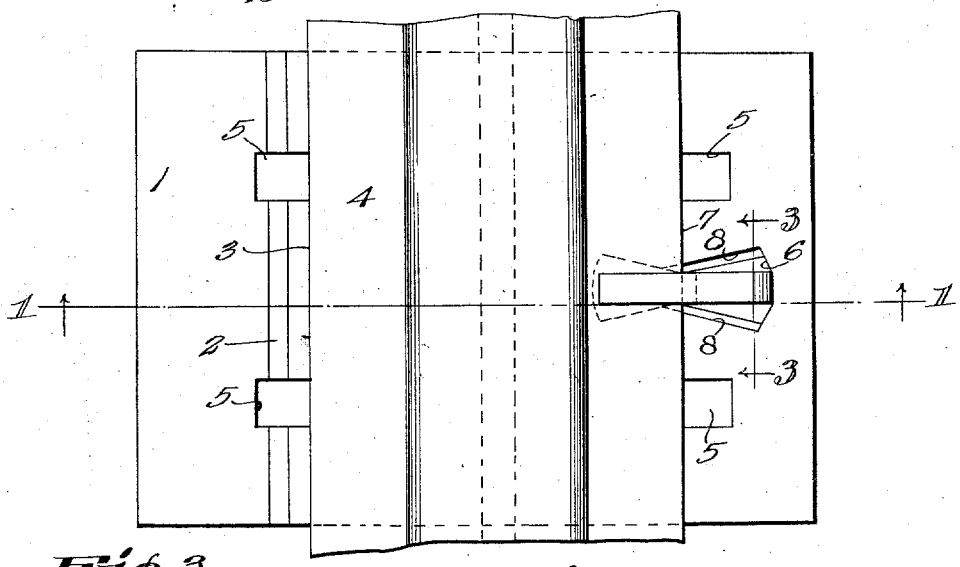
Figure 2:
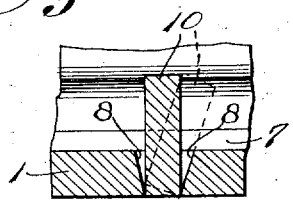

Fig. 1 is a vertical sectional view through a tie plate and rail showing the anchor member in elevation; Fig. 2 is a plan view of a section of rail on the tie plate with the anchor member in place; Fig. 3 is a section on the line 3—3 of Fig. 2; Figs. 4 and 5 are views similar to Figs. 1 and 2 respectively but showing a modified form of anchor member and slot; Fig. 6 is a section on the line 6—6 of Fig. 5; and Fig. 7 is a fragmentary view showing the normal and engaging positions of the jaws of the anchor member.

As illustrated, there is shown the usual tie plate 1 having an abutment or shoulder 2, the rail resting on the plate with the outer edge 3 of the base flange 4 against the abutment. The tie plate is provided with the usual apertures 5 to receive the spikes used to hold the rail in place.

On the gage side of the rail, the tie plate is provided with an anchor member receiving slot 6 which is preferably the shape of a double trapezoid with the narrow parts connected forming a six sided slot, narrow at the center, which is substantially in line with the inner edge 7 of the base flange of the rail. The two outer sides 8 of the slot are cut at an angle so that the slot is wider at the top than at the bottom as is best shown in Fig. 3. An anchor member 10 is mounted in the slot, the member being U-shaped with a slot therein to receive the rail base flange. The lower portion 11 of the member is of substantially the thickness of the tie plate and the member is wide enough to fit fairly snugly in the narrow portion of the slot. The upper portion 12 of the member has its lower or flange engaging surface 13 formed at an angle so as to engage with the sloping upper surface of the base flange of the rail, but, as shown in Fig. 7, the angle between the two portions of the anchor member is less than the angle between the lower and upper surfaces of the base flange of the rail. The anchor member is formed of spring steel and may be driven on said base flange and the angle, as shown in Fig. 7, is the same for both forms of anchor members.

In the form shown in Fig. 2 the gage end of the slot is formed on a curve and with a radius less than the distance between the center line and the end of the slot so that as the member tends to pivot around about the center line it will be forced tighter onto the base flange. Furthermore, in any tipping action of the anchor member which may occur as shown in dotted lines in Fig. 3, the edges of the member tend to dig into or grip the base flange tighter.

The form shown in Figs. 4 to 6 is similar to that shown in Figs. 1 to 3 but here the anchor member 20 is more nearly V-shaped, the two legs 21 being similar and having their end faces 22 at right angles to the outer surfaces 23 of the legs so that either face 22 will contact with the ends 24 of the slot 25 which is formed like the slot 6 except for the outer end 24′ which is parallel with the edge of the base flange of the rail. The end faces 22 are at an angle to the plane of the sides of the member and the anchor member is normally placed at an acute angle to the line of the base flange and toward the end of the rail opposite to the movement of the rail which it is desired to resist. Thus in Fig. 5 the movement of the rail which will be prevented would be movement toward the top of the sheet which would tend to pivot the member 20 about the center line of the slot and force it tighter onto the flange.

It will be noted that the anchor member is free to move inwardly of the slot as the member is slightly shorter than the slot. In placing the present device on a rail the tie plate is inserted under the rail, with the anchor member in place and the tie plate and member are driven into position from the gage side of the rail until the base flange of the rail drops into position behind the abutments 2. With the type of slot and anchor member illustrated in Figs. 1 and 2 the member is normally at right angles to the base flange. In the form shown in Figs. 4 and 5, the member is at an angle and it is merely necessary to reverse the member to present the same to resist movement in the other direction.

In the present device the anchor member is permitted to have vertical movement with the rail independently of the tie plate, but movement transversely of the rail is prevented as the anchor holds the rail tightly against the tie plate shoulders or abutments. Wear between the base flange and the abutments is automatically compensated for by the spring action of the anchor itself and slight transverse movement of the tie plate due to loose spikes does not affect the holding power of the anchor except as it might force the member tighter on the base flange.

The present anchor is mounted on the gauge side of the rail and this is an important feature as where similar types of anchor members have been employed on the opposite side they quickly loosen and become ineffective if the tie plate moves outwardly and as the tendency is always to force the rail and tie plate outwardly, that is to widen the gauge, an anchor member on the outside has been found unsatisfactory. The present tie plate and anchor members are easy to manufacture and the slot in the tie plate is merely punched out when the spike apertures are formed while the anchor members are punched or cut out of spring steel stock.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a tie plate rail anchor, the combination of a tie plate having an abutment on one side and a slot on the gage side of the rail, such slot being narrower at the center than at the ends, and an anchor member provided with base flange engaging members mounted in such slot and adapted to pivot about the narrow center thereof.

2. In a tie plate rail anchor, the combination of a tie plate having an abutment on one side and a slot on the gage side of the rail, such slot being narrower at the center than at the ends, and an anchor member provided with base flange engaging members mounted in such slot and adapted to pivot about the narrow center thereof, the end of such member being adapted to contact the end of the slot to force the member tighter on the base flange during pivotal movement of the member.

3. In a tie plate rail anchor, the combination of a tie plate having an abutment on the outer side and a slot on the gage side, such slot being in the shape of a double trapezoid with its narrow portion at the center and approximately in line with the gage edge of the rail base flange, and an anchor member of spring steel having a slot adapted to receive the base flange of the rail, said member being mounted in such slot and adapted to pivot about such narrow center portion, the gage end of said member contacting the end of such slot to force said member tighter on said rail during pivoting movement.

4. In a tie plate rail anchor, the combination of a tie plate having an abutment on the outer side and a slot on the gage side, such slot being in the shape of a double trapezoid with its narrow portion at the center and approximately in line with the gage edge of the rail base flange, and an anchor member of spring steel having a slot adapted to receive the base flange of the rail, said member being mounted in such slot and adapted to pivot about such narrow center portion, the gage end of such slot and anchor member being so formed as to force said member tighter on the base flange of said rail during pivotal movement of said member.

5. In a tie plate rail anchor, the combination of a tie plate having an abutment on one side and a slot on the gage side of the rail, such slot being narrower at the center than at the ends, and an anchor member provided with base flange engaging members mounted in such slot and adapted to pivot about the narrow center thereof, the portion of such slot on the gage side of the base flange being wider at the top than at the bottom to allow said member to pivot about a horizontal axis and increase its gripping effect on the rail.

6. In a tie plate rail anchor, the combination of a tie plate having an abutment on the outer side and a slot on the gage side, such slot being in the shape of a double trapezoid with its narrow portion at the center and approximately in line with the gage edge of the rail base flange, and an anchor member of spring steel having a slot adapted to receive the base flange of the rail, said member being mounted in such slot and adapted to pivot about such narrow center portion, the gage end of said member contacting the end of such slot to force said member tighter on said rail during pivoting movement, the portion of such slot on the gage side of the base flange being wider at the top than at the botom to allow said member to pivot about a horizontal axis and increase its gripping effect on the rail.

7. In a tie plate rail anchor, the combination of a tie plate having an abutment on the outer side and a slot on the gage side, such slot being in the shape of a double trapezoid with the narrow portion approximately in line with the gage edge of the base flange of the rail, and an anchor member adapted to fit in such slot and be driven into place with said tie plate, said member having a V-shaped slot to receive the base flange and having its engaging surfaces at a less angle than the angle of the surfaces of the rail base flange.

8. In a tie plate rail anchor, the combination of a tie plate having an abutment on the outer side and a slot on the gage side, such slot being in the shape of a double trapezoid with the narrow portion approximately in the line with the gage edge of the base flange of the rail, and an anchor member adapted to fit in such slot and be driven into place with said tie plate, said member having a V-shaped slot to receive the base flange and have its engaging surfaces at a less angle than the angle of the surfaces of the rail base flange, said member having its gage end in contact with the gage end of the slot and being adapted to pivot about the narrow center of such slot to force the member into tighter engagement with the base flange.

9. In a tie plate rail anchor, the combination of a tie plate having an abutment on the outer side and a slot on the gage side, such slot being in the shape of a double trapezoid with the narrow portion approximately in line with the gage edge of the base flange of the rail, and an anchor member adapted to fit in such slot and be driven into place with said tie plate, said member having a V-shaped slot to receive the base flange and having its engaging surfaces at a less angle than the angle of the surfaces of the rail base flange, said member having its gage end in contact with the gage end of the slot and being adapted to pivot about the narrow center of such slot, the end of said anchor member and slot being so formed as to force the member onto the rail base flange during such pivotal movement.

10. In a tie plate rail anchor, the combination of a tie plate having an abutment on the outer side and a slot on the gage side, such slot being in the shape of a double trapezoid with the narrow portion approximately in line with the gage edge of the base flange of the rail, and an anchor member adapted to fit in such slot and be driven into place with said tie plate, said member having a V-shaped slot to receive the base flange and having its engaging surfaces at a less angle than the angle of the surfaces of the rail base flange, said member having its gage end in contact with the gage end of the slot and being adapted to pivot about the narrow center of such slot, said anchor being normally placed at an angle to the edge of the base flange and having its end so shaped as to force the member tighter on the rail during pivotal movement about the center of such slot.

11. In a tie plate rail anchor, the combination of a tie plate having an abutment on the outer side and a slot on the gage side, such slot being in the shape of a double trapezoid with the narrow portion approximately in line with the gage edge of the base flange of the rail, and an anchor member adapted to fit in such slot and be driven into place with said tie plate, said member having a V-shaped slot to receive the base flange and having its engaging surfaces at a less angle than the angle of the surfaces of the rail base flange, said member having its gage end in contact with the gage end of the slot and being adapted to pivot about the narrow center of such slot, said anchor being normally placed at an angle to the edge of the base flange and having its end so shaped as to force the member tighter on the rail during pivotal movement about the center of such slot, the anchor being reversible to allow it to be placed at the same angle to the base flange but in the opposite direction to act as an anchor against movement of the rail in either direction.

12. A tie plate rail anchor, the combination of a rail having a base flange, a tie plate having an abutment on the outside and a slot on the opposite or gage side, and an anchor member of spring steel having a slot adapted to receive the base flange of the rail, said member being mounted in said slot and engaged with said base flange and applied by drawing said tie plate under said base flange to force said flange between said abutment and said anchor member in said slot.

13. A tie plate rail anchor, the combination of a rail having a base flange, a tie plate having an abutment on the out side and a slot on the opposite or gage side, and an anchor member of spring steel of general U-shape having jaws adapted to engage the base flange of the rail, said member being shorter than said slot, said anchor being positioned on said rail by forcing said tie plate underneath said base flange with said member engaging said flange to tightly secure said base flange between said abutment on one side and said member in said slot on the gage side.

Signed by me, this 14 day of August, 1924.

HENRY STEPHENS.